Oct. 13, 1970    W. R. AZIM    3,533,583

ADJUSTABLE SUPPORT APPARATUS

Filed June 14, 1968    3 Sheets-Sheet 1

INVENTOR.
WAKEEM R. AZIM

BY
Robert E. Breidenthal
ATTORNEY

Oct. 13, 1970
W. R. AZIM
3,533,583
ADJUSTABLE SUPPORT APPARATUS
Filed June 14, 1968
3 Sheets-Sheet 2
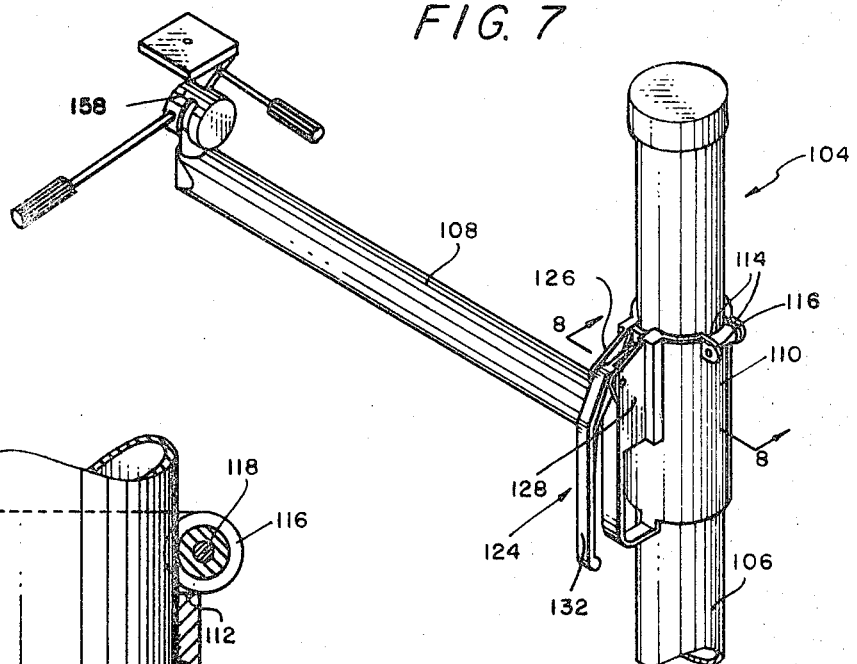
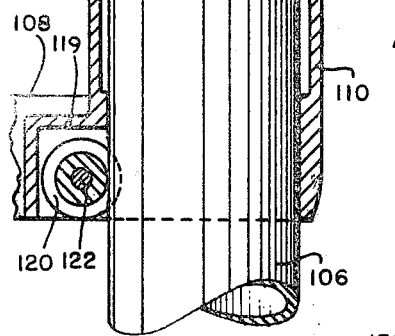
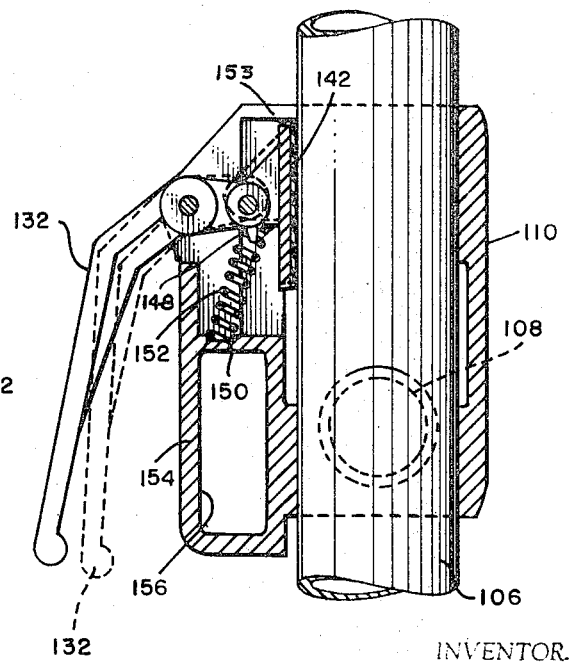
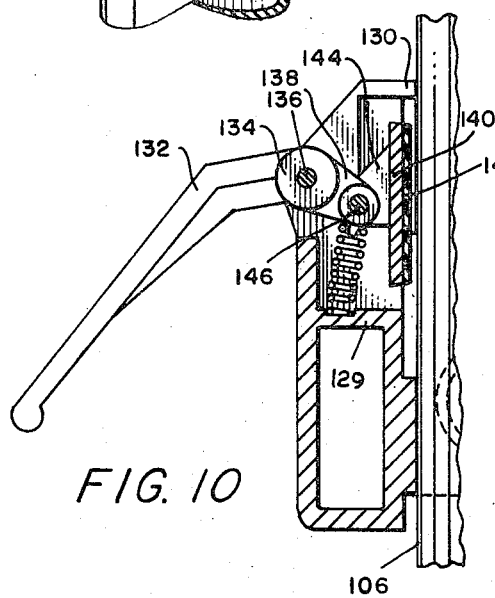
INVENTOR.
WAKEEM R. AZIM
BY *Robert E Breidenthal*
ATTORNEY

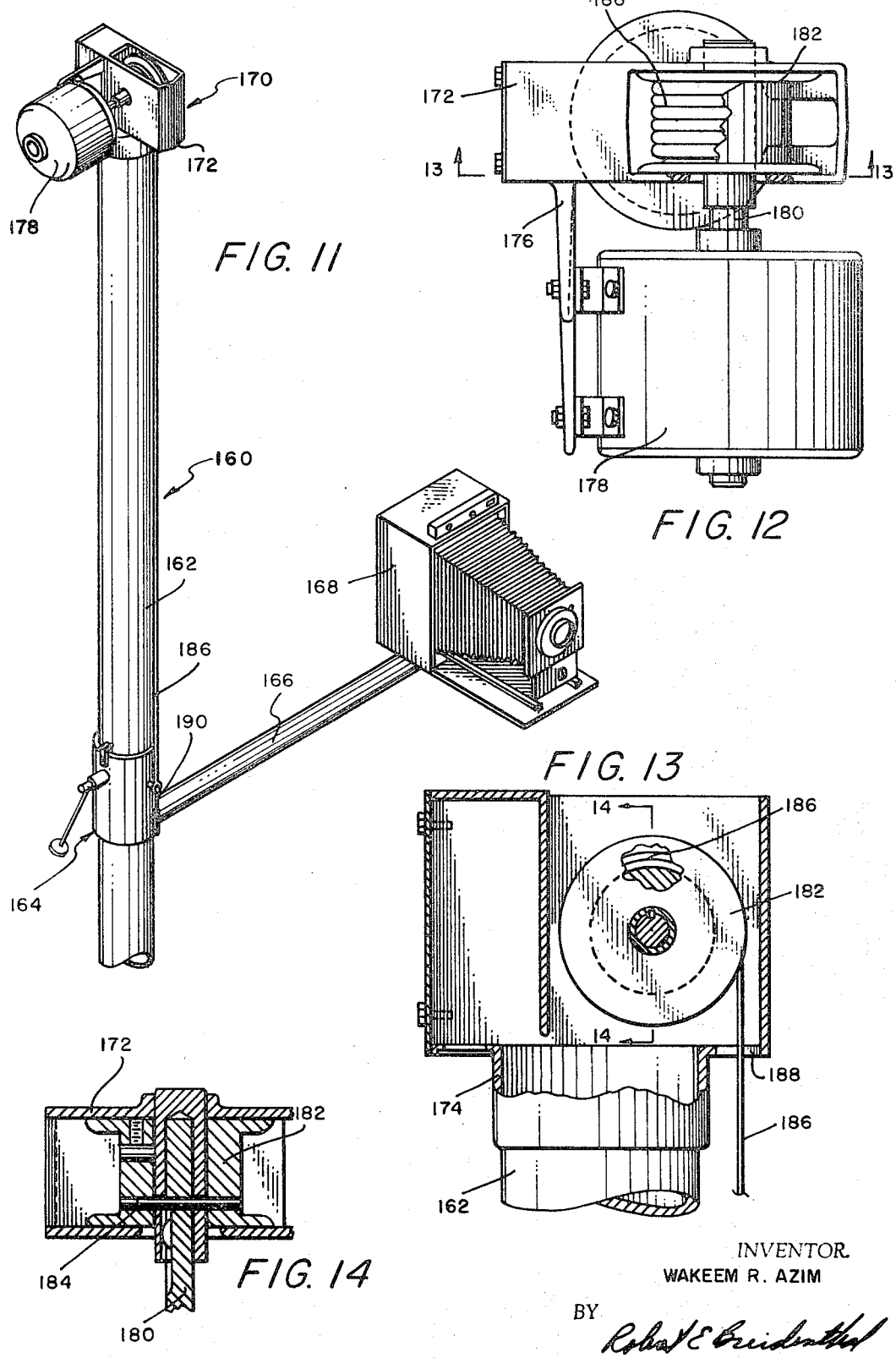

United States Patent Office 3,533,583
Patented Oct. 13, 1970

3,533,583
ADJUSTABLE SUPPORT APPARATUS
Wakeem R. Azim, Wichita, Kans., assignor to Arkay Corporation, Milwaukee, Wis., a corporation of Wisconsin
Filed June 14, 1968, Ser. No. 737,149
Int. Cl. A47g 29/00
U.S. Cl. 248—125
5 Claims

ABSTRACT OF THE DISCLOSURE

A support stand having a vertical column upon which a hub structure is rotatably and vertically movable. A support arm is fixed to and extends radially and horizontally from such structure. Antifriction means including rollers are provided for maintaining the hub structure and the column in coaxial relationship, minimizing friction, and for imparting substantially all bending moment resulting from loading upon the support arm to the column through the rollers. The hub structure additionally includes braking and selective locking means operative by manual control means to engage the column to effect desired braking or releasable fixing of relative positions of the hub structure. The outer end of the arm is adapted to support a camera or the like, and an accessory tray is adjustably mounted, both as to angular position about the arm and along its length. Electrically powered means are provided for selectively raising and allowing the support arm to gravitationally descend.

---

The present invention pertains to new and useful improvements in adjustable support stands, and more particularly pertains to support stands especially well suited for use in photographic work as by adjustably supporting a camera or the like.

The present invention is directed to the same class of subject matter as that disclosed in my U.S. Letters Patent 3,269,681 entitled Adjustable Support Apparatus that issued Aug. 30, 1966, and the present invention is generally directed to the same objectives and is intended for the same general purposes as the apparatus disclosed in my Letters Patent.

It is the primary objective of the instant invention to still further reduce friction and any possible tendency to chatter upon movement of the vertically adjustable part of the apparatus, and to also maintain relatively movable parts in proper alignment with each other.

Closely related to the objective specified in the preceding paragraph is the objective of applying any bending moments or torques resulting from loads carried by the stand to the vertical support column essentially solely through antifriction means as a force couple.

Another object of this invention is to provide an attachment for the support stand adapted to support accessories that may be needed during the use of the support stand, such as supporting and maintaining easily accessible photographic accessories when the support stand is employed to support a camera in photographic work.

Yet another object of the present invention is to provide an improved brake or locking device for preventing or in a controllable fashion providing resistance to relative movement of parts of the stand otherwise free to move relative to each other.

A final object to be specifically enumerated is to provide power means to facilitate making adjusting movements of the relatively movable parts.

A broad aspect of the instant invention involves, in an adjustable support stand of the type including a vertical support column having a horizontal support arm vertically adjustable thereupon, the improvement comprising an elongated vertical sleeve embracing and vertically movable along the column, said support arm having one end fixed to and extending radially from the sleeve, brake means carried by the sleeve and engageable with the column for variably and frictionally opposing relative movement of said sleeve with respect to said column, and antifriction means for maintaining said sleeve and said column in coaxial relationship and also for application of any bending moment of the supoprt arm to said column as a force couple, said antifriction means comprising a first roller means carried by said sleeve adjacent the lower end thereof and at a position angularly adjacent in the horizontal plane to the direction of the extent of said support arm from said sleeve, said first roller means bearing against said column in rolling engagement therewith, and a second roller means carried by the upper end thereof and at a position angularly adjacent in the horizontal plane to a position diametrically opposed to the direction of the extent of said support arm from said sleeve, said second roller means bearing against said column in rolling engagement therewith.

Another aspect of the invention has to do with the matter set forth in the preceding paragraph and involves one of the roller means including a pair of rollers rotatably mounted on the sleeve, and the pair of rollers being angularly spaced from each other.

Another aspect of the invention involves the matter set forth in the penultimate paragraph, wherein the brake means comprises a handle pivotally connected intermediate its ends to said sleeve, and a brake shoe pivotally connected to one end of the handle, said handle, said brake shoe and their pivotal connections being so constructed and arranged that pivotal movement of said handle actuates movement of the brake shoe towards and away from frictional bearing engagement against said column, and spring means yieldingly urging pivotal movement of the handle in a direction corresponding to forcible movement of the brake shoe toward said column..

A very important feature of the invention resides in the handle for braking or locking the vertically movable parts against vertical movement being connected to the brake shoe in a manner analogous in action to a toggle linkage.

Still another important feature of the invention is the employment of a pair of rollers equiangularly disposed upon opposite sides of the support arm, which together with another roller diametrically opposed to the support arm serves to maintain the sleeve and the column in coaxial relationship.

Yet another important feature of the invention resides in providing two vertically spaced diametrically opposed rollers with each of such rollers being concaved along its axial extend whereby there is established essentially arcuate lines of rolling contact between the rollers and the support column.

These and other objectives, aspects, features and advantages of the invention will manifest themselves during the ensuing description of preferred embodiments of the invention when considered together with the accompanying drawings illustrative thereof, wherein:

FIG. 7 is a fragmentary isometric view of another form of the invention, and illustrates the upper end portion of the support column and the support arm applied to support an adjustable camera mount;

FIG. 8 is an enlarged vertical sectional detail view taken upon the plane of the section line 8—8 in FIG. 7, and illustrates particularly the means for guiding vertical movement of the support arm upon the vertical column, the latter being shown in elevation and with hidden details of construction being shown in dashed outline;

FIG. 9 is a vertical sectional detail view of the structure shown in FIG. 8, this view being taken upon a vertical plane perpendicular to that indicated by the section line 8—8 in FIG. 7, this view showing the brake handle in full lines with the brake only partially applied, and such handle being shown in dashed outline at an alternative position corresponding to full brake application.

FIG. 10 is another vertical sectional detail view generally corresponding to that shown in FIG. 9, this view showing the brake handle in its brake release position;

FIG. 11 is a fragmentary isometric view of yet another embodiment of the invention, this view showing the same applied to support a camera, and as including electrical power means for vertically moving the support arm upon the vertical column;

FIG. 12 is an enlarged top plan view of the structure shown in FIG. 11 with the camera and the support arm being omitted, and with hidden details of the structure being shown in dashed outline;

FIG. 13 is an enlarged vertical sectional detail view taken upon the plane of the section line 13—13 in FIG. 12, with portions of the structure being shown broken away and in section, and with certain hidden details of the structure being indicated in dashed outline; and FIG. 14 is an enlarged vertical sectional detail view taken upon the plane of the section line 14—14 in FIG. 13.

Figure 1:
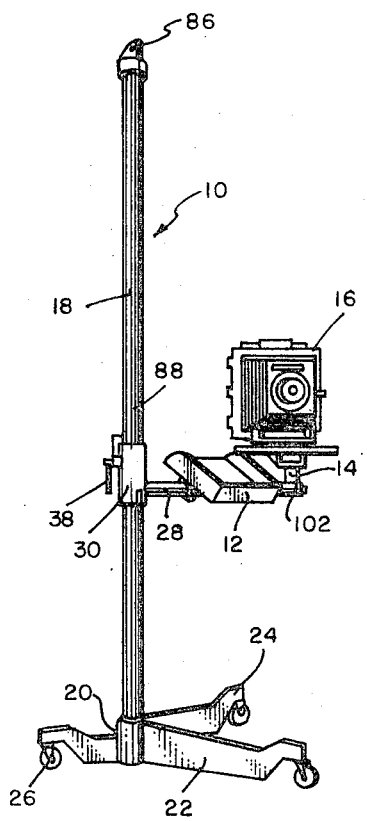
FIG. 1 is an isometric view of the adjustable support stand as applied to supporting a camera and its mount as well as a photographic accessory tray.

Referring now to the drawings wherein like numerals designate like parts throughout the various views, and initially directing attention to the embodiment of the invention shown in FIGS. 1 through 6, the reference numeral 10 designates generally the adjustable support stand. In FIG. 1, the stand 10 is illustrated as applied to support a tray 12, an adjustable camera mount 14, and a camera 16.

The adjustable support stand 10, except as hereinafter indicated to the contrary, is identical to the support stand or camera stand similarly designated in my U.S. Letters Patent No. 3,269,681 that issued Aug. 30, 1966, entitled Adjustable Support Apparatus. This being the case, the disclosure of said U.S. Letters Patent No. 3,269,681 is incorporated as a part of this specification by reference thereto.

Briefly, the support or camera stand 10 comprises an elongated upright tubular column 18 with a base 20 connected to the lower end thereof. The base 20 has a plurality of generally horizontal, radiating legs 22 that terminate in upwardly projecting end portions 24, all in general conformity with the disclosure of my previously mentioned Letters Patent. As will be evident upon inspection of FIG. 1, the upwardly projecting end portions 24 of the legs 22 are provided with casters 26, whereby the support stand 10 can be freely moved about upon any flat supporting surface, not shown.

A camera support arm 28 is rotatably and vertically movably mounted on the column 18 of the support stand 10 by means now to be described. The horizontally extending support arm 28 has integrally fixed to one end thereof a vertically extending sleeve or hub structure 30 which is slidably disposed about or embraces the column 18. A mechanism is provided to releasably lock or fix the support arm 28 in relation to the column 18, such releasable lock mechanism consisting of a threaded aperture 32 in one side of the sleeve or hub 30, preferably in a side diametrically opposed to the support arm 28 and at a position intermediate the vertical extent of the sleeve 30, and a plunger 34 having a threaded portion 36 in threaded engagement with the threaded aperture 32. A knobbed handle 38 is provided on the outer end portion of the plunger 34, whereby the plunger 34 can be manually actuated to move radially inwardly and outwardly with respect to the vertical central axis of the sleeve or hub structure 30. A follower block 40 is provided on the radially inward end of the plunger 34, and a brake shoe 42 is secured to the side of the follower block 40 facing toward the column 18, the arrangement being such that the shoe 42 can be caused to bear with an adjustable degree of force against the external surface of the column 18, and which shoe 42 can be caused to be moved radially outward if desired to an extent sufficient to be entirely disengaged from the column 18. The adjustable amount of force with which the shoe 42 can be caused to bear against the column 18 will be, as will be readily understood, at least sufficient to positively prevent for all practical purposes any vertical movement, upwardly or downwardly, of the sleeve or hub structure 30 with respect to the column 18. Although not essential, it is preferred that the shoe 42 be formed of an elastomeric material such as neoprene or the like such as to possess with respect to the metallic column 18 a relatively high coefficient of friction to obtain the braking action desired, and yet which will not scar or mar the external surface of the metallic column 18.

An adjustable roller means 44 is mounted upon and carried by the sleeve or hub structure 30 at the upper end of the latter and on the side of the latter diametrically opposed to the extent of the support arm 28 for the purpose of achieving an antifriction action when it is desired to move the sleeve 30 vertically, either upwardly or downwardly, along the vertical extent of the support column 18. The roller means 44 comprises a roller mounting arm 46 that is pivotally mounted upon the sleeve 30. The sleeve 30 is provided with a recess 48 and a threaded aperture 50 opposite the roller mounting arm 46. The roller mounting arm 46 has a detent 52 which is positioned in the recess 48 to thereby pivotally secure the lower end of the vertically extending roller mounting arm 46 to the sleeve or hub structure 30. An aperture 54 is positioned in generally the central portion of the vertical extent of the roller mounting arm 46, and the upper end portion of the arm 46 is bifurcated as indicated at 56, and a roller 58 is rotatably mounted within the bifurcated portion 56 of the arm 46 by means of an axle 60. The arrangement is such that the roller 48 is disposed above the upper end of the sleeve structure 30 and is in rolling engagement with the column 18.

A bolt 62 is disposed in the central aperture 54 in the arm 46, and such bolt 62 is threadingly engaged in the threaded aperture 50 in the sleeve 30. It will be evident that the bolt 62 can be threadingly adjusted in the threaded aperture 50 to vary the radial relationship of the roller 58 with respect to the column 18.

The roller 58 provides a rolling support with respect to horizontal forces for the upper portion of the sleeve 30 diametrically opposed to the arm 28.

Figure 2:
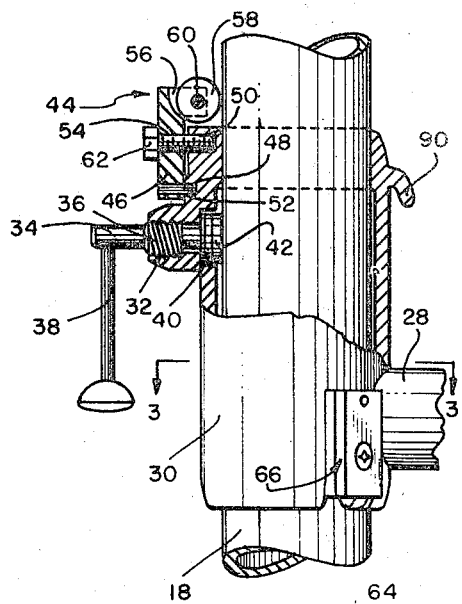
FIG. 2 is an enlarged fragmentary elevational view of the structure for mounting the support arm upon the support column, portions of the structure being broken away and shown in vertical section.
Figure 3:
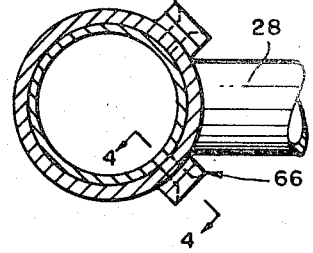
FIG. 3 is a horizontal sectional detail view taken upon the plane of the section line 3—3 in FIG. 2.

As thus far described, the stand 10 is identical to that disclosed in my previously mentioned Letters Patent. The structure of the stand 10 of the present invention differs substantially from that disclosed in my earlier Letters Patent by the provision of additional roller means to obtain antifriction action during the course of vertical movements of the sleeve or hub structure 30 with respect to the column 18, especially when the support arm 28 is heavily burdened so as to impart a bending moment of substantial magnitude to the sleeve or hub structure 30. Such additional roller or antifriction means comprises the provision of a pair of identical roller means 64 and 66 disposed adjacent the lower end of the sleeve or hub structure 30 on a side of the latter substantially though not exactly diametrically opposed to the position occupied by the previously described roller means 44. More specifically, the roller means 64 and 66 are equiangularly spaced from a position diametrically opposed to the position of the roller means 44 with respect to the horizontal plane, and the angular spacing between the roller means 64 and 66 can be sufficiently great that the juncture of the support arm 28 with the sleeve 30 can be symmetrically interposed therebetween as shown in FIGS. 2 and 3, it being recalled that the arm 28 occupies a position diametrically opposed to the roller means 44. Since the roller means 64 and 66 are identical to each other, a detailed description of the roller means 66 will suffice for both. Accordingly, only the roller means 66 is described in detail. The roller means 66 is substantially of the same character as the previously described roller means 44, and it will be seen that the roller means 66 comprises a roller mounting arm 68 pivotally mounted to the lower end portion of the sleeve 30 by means of the sleeve structure 30 being provided with a recess 70 that receives a detent 72 carried by the upper end portion of the arm 68. The sleeve structure 30 is provided with a threaded aperture 74 which threadingly receives a threaded screw 76 that rotatably extends through an opening 78 in the arm 68, whereby the lower end of the arm can be adjustably moved radially inwardly with respect to the column 18. The lower L-shaped end portion 80 of the arm 68 is bifurcated and a roller 82 is rotatably mounted within such bifurcated portion 80 upon an axle 84. The arrangement is such that the roller 82 engages the column 18 with the precise radial positioning of the roller 82 being adjustable by means of the threaded screw 76.

It will be appreciated by those skilled in the art that the relative angular positions of the roller means 44, 64 and 66 together with the roller means 44 being adjacent the upper end of the sleeve 30 diametrically opposite the support arm 28 and with the roller means 64 and 66 being disposed at the lower end of the sleeve 30 and adjacent the support arm 28 that all of such roller means 44, 64 and 66 cooperate with each other in maintaining the sleeve or hub structure coaxially disposed about the column 18, guide vertical movements of the sleeve 30 with respect to the column 18, and produce an optimized antifriction action even when substantial bending moments are imposed upon the sleeve structure 30 by loading of the support arm 28.

As in the case of the support stand disclosed in my previously mentioned Letters Patent, a spring balance 86 is rotatably mounted on the top of the column 18, and the cable 88 of such spring balance means 86 is secured to a projection 90 on the sleeve structure 30.

Figure 5:
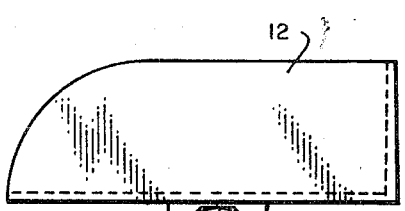
FIG. 5 is an enlarged sectional detail view taken upon the plane of the section line 5—5 in FIG. 6, hidden details of structure being shown in dashed outline.
Figure 6:
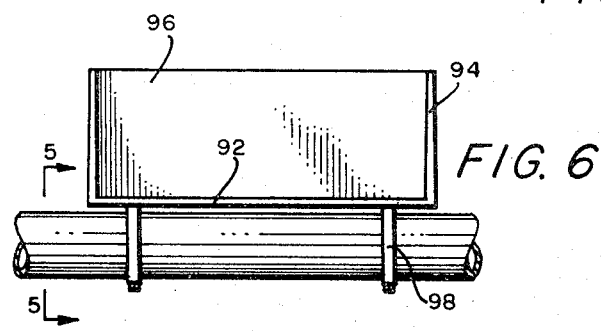
FIG. 6 is an enlarged fragmentary detail view taken directly into the open end of the photographic accessory tray.
Figure 4:
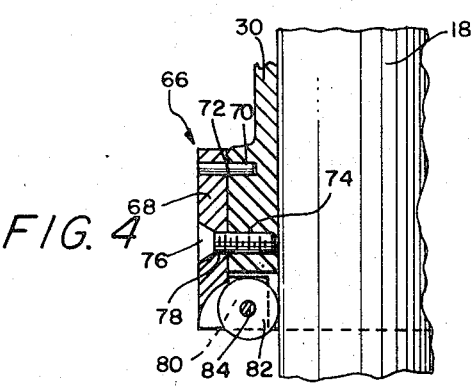
FIG. 4 is an enlarged sectional detail view taken upon the plane of the section line 4—4 in FIG. 3.

The tray 12, which can conveniently constitute a tray for photographic accessories, is comprised of a flat bottom wall 92 having upstanding side walls 94 and an upstanding rear wall 96. The underside of the bottom wall 92 is provided with a pair of spaced, depending brackets 98 of inverted U-shaped configuration which straddle the tubular support arm 28 as shown in FIGS. 5 and 6. The mounting brackets 98 are dimensioned to obtain snug straddling fits over the arm 28, and each of such brackets 98 is provided with threaded clamping means 100 extending beneath the arm 28 for tightening the engagement of the brackets 98 upon the arm 28 whereby to adjustably fix the relative position of the tray 12 with respect to the support arm 28.

As in the case of the disclosure of my previously mentioned Letters Patent, means 102 are provided at the outer end of the support arm 28 for releasably and adjustably securing the camera mount 14 to the outer end of the support arm 28.

Proceeding now to a consideration of the embodiment of my invention disclosed in FIGS. 7 through 10, this embodiment of the support stand being designated generally at 104, it will be understood that the upright vertical column 106 of the stand 104 is provided with a base structure, not shown, such as that indicated at 20 through 26 in FIG. 1.

The stand 104 includes a horizontal support arm 108 which has one end thereof rigidly attached to and preferably integral with a vertically extending sleeve or hub structure 110 so as to extend horizontally and radially outward from the latter with the juncture of the arm 108 and the sleeve 110 being adjacent and preferably at the lower end of the latter as shown in FIG. 8.

The sleeve or hub structure 110 is disposed about or embraces the vertical tubular column 106 and as in the case of the previously described sleeve or hub structure 30, the internal dimensions of the sleeve or hub structure 110 is such as to have free sliding clearance with respect to the column 106 so that the sleeve 110 can be freely rotated about the column 106 and freely moved vertically therealong.

At its upper end and at a position diametrically opposed in horizontal projection to the juncture of the arm 108 with the sleeve 110, the sleeve is provided with a recess or notch 112, and the sleeve 110 is provided with a pair of radially outward projecting ears 114 on opposite sides of the recess or notch 112, and a roller 116 is disposed between the ears 114 and mounted for rotation on the ears 114 by means of an axle or pivot pin 118. The roller 118 rotates about a horizontal axis that is perpendicular to its radial relationship to the coincident vertical axes of the column 106 and the sleeve 110. The roller 116 has a concave external configuration along its axial extent, the curvature of which corresponds to the external curved surface of the column 106, and the arrangement is such that the roller 116 is in rolling engagement with the column 106.

The sleeve or hub structure 110 is provided with a cavity 19 at its juncture with the support arm 106, and as will be seen in FIG. 8, such cavity 119 opens downwardly and also to the interior of the sleeve 110, that is, to the external surface of the column 106 within the sleeve 110. A roller 120 of the same character as the previously described roller 116 is disposed within the cavity 119 and is mounted on the sleeve structure 110 for rotation about a horizontal axis by means of an axle or pivot pin 122. The arrangement is such that the roller 120 is in rolling engagement with the external curved surface of the column 106.

Since the rollers 116 and 120 are diametrically opposed with respect to the horizontal plane, and since the roller 116 is spaced above the roller 120 with the latter being disposed on the same side of the sleeve 110 as the direction of the extent of the support arm 108, it will be evident that the bending moment imparted to the column 106 by the support arm 108 and loads carried by the latter is carried substantially by the two rollers 116 and 120 so that there is little, if any, bearing engagement of the sleeve 110 against the column 106, and therefore a highly efficient antifriction effect is obtained when it is desired to move the sleeve 110 vertically, either upwardly or downwardly, along the column 106, this being true even when the support arm 108 is supporting a substantial load adjacent its outer end. It is also to be noted that the rollers 116 and 120 each have substantially only arcuate lines of contact with the column 106, and accordingly, the sleeve 110 can be rotated on the column 106 with minimal effort, even when the support arm 108 is heavily loaded. While the rollers 116 and 120 can be metallic as indicated by the cross hatching thereof in the drawings, if desired or deemed expedient, such rollers 116 and 120 can be formed of nonmetallic materials characterized by having low coefficients of friction with metals, such materials as nylon or Teflon (the latter being particularly well suited when coated upon a rigid base material which could be metal). It should be noted that the rollers included in the embodiment of the invention illustrated in FIGS. 1 through 6 can also be of nonmetallic materials of low coefficient friction characteristics with respect to metals as in the case of the rollers 116 and 120.

Whereas the sleeve 30 of the previously described embodiment of the invention was maintained coaxial with the column 18 by means of the three rollers thereof being angularly spaced from each other in the horizontal plane, it is not necessary that more than two rollers be employed in the embodiment of the invention now being discussed, this for the reason that the rollers 116 and 120 are concaved so as to be complementary to the circular cylindrical external configuration of the column 106 as will be appreciated.

The support stand 104, as in the case of the previously described embodiment of the invention, also includes means for adjustably braking and for releasably locking the sleeve 110 and the support arm 108 carried thereby with respect to the column 106. Such means are designated generally at 104, and the same comprises the sleeve or hub structure 110 including a housing configuration at its upper end at a position at a side thereof angularly bisecting, in the horizontal plane, the posiions occupied by the rollers 116 and 120; such housing configuration being constituted in part by a pair of vertical, horizontally spaced, and radially extending integral flanges 126 and 128 that are connected at their lower edges by a horizontal integral web 129. The space intermediate the flanges 126 and 128 opens freely or unobstructedly to the external surface of the column 106 extending through the sleeve 110 as indicated at 130.

A handle 132 is provided which extends from a position external of the sleeve or hub structure 110 into the space between the flanges 126 and 128, and an intermediate portion 134 of the handle 132 is pivoted to the sleeve 110 for vertical swinging movement by an axle or pivot pin 136 extending horizontally between the flanges 126 and 128. The handle 132 includes a portion 138 that extends from the pivot pin 136 toward the column 106 within the sleeve 110. A shoe backing plate 140 is movably disposed between the flanges 126 and 128 at a position intermediate the free, that is, inner end of the handle portion 138 and the column 106 within the sleeve 110 as clearly shown in FIGS. 9 and 10. The side of the plate 140 facing toward the column 106 has attached thereto an elastomeric brake shoe material 142, the brake shoe 142 being securely attached or fastened to the plate 140 in any suitable manner such as by an adhesive, not shown. The material of the brake shoe 142 is resiliently deformable and is of a character such as to have a high coefficient of friction with respect to metals, and the material of the brake shoe 142 can, for example, be of neoprene.

The side of the shoe backing plate 140 opposite the column 106 is provided with a pair of vertical and parallelly spaced ears 144 that extend generally toward the pivot pin 136. The ears 144 are disposed on the opposite sides of the handle portion 138, the latter being received between such ears 144 and being pivotally connected thereto by means of a pivot pin 146.

It will be seen, as thus far described, that vertical swinging movement of the handle 132 articulates movement of the shoe 142 towards and away from the column 106. The arrangement is such that when the handle 132 is pivoted in a clockwise direction as viewed in FIGS. 9 and 10 to the position shown thereof in FIG. 10, the horizontal or radial spacing of the parallel pivot pins 136 and 138 is less than that when the handle 132 is in the full line position shown thereof in FIG. 9, and consequently, movement of the handle 132 into the position shown thereof in FIG. 10 causes radial outward movement of the shoe 142. When the parts are in the position shown thereof in FIG. 10, the shoe 142 is entirely out of contact with the column 106; however, the pivotal connection 146 between the shoe 142 and the handle portion 138 is sufficiently free that the shoe 142 will pivot clockwise by virtue of the asymmetrical disposition of the weight of the plate 140, the shoe 142 and the ears 144 with respect to the pivot 146 to the extent that the upper end of the shoe 142 bears with a slight radial force against the column 106. Such radial bearing of the upper end of the shoe 142 against the column 146 is such as to impose virtually no braking effect against upward and downward movement of the sleeve 110 along the vertical column 106 as long as the handle 132 is held in the position shown thereof in FIG. 10. However, such slight braking effect is sufficient that if the handle 132 is freed of the application of any external forces, downward movement of the sleeve 110 relative to the column 106 will tend to cause counterclockwise pivotal movement of the handle 132 with resulting progressively greater force being brought to bear upon the column 106 by the shoe 142 with the end result that effective braking of such downward movement of the sleeve 110 will automatically occur. It is to be understood that it is not essential to the practice of the invention that the pivotal connection between the shoe 142 and the handle portion 148 be loose or relatively free as will be presently manifest. It will be noted that the vertical extent of the shoe 142 above the pivot pin 146 is sufficiently great that no automatic braking effect such as previously described will occur even when the pivotal connection is loose or free as long as the handle 132 is maintained in the position shown thereof in FIG. 10.

When the handle 132 is moved to the full line position shown thereof in FIG. 9, the shoe 142 is forcibly held against the column 106 with sufficient force to lock the sleeve 110 against any relative movement with respect to the column 106, either as to rotation about the axis of the column 106 or vertically therealong. It will be evident that positions of the handle 132 intermediate the positions shown thereof in FIG. 10 and FIG. 9 will correspond to varying degrees of braking action against movement of the sleeve 110 with respect to the column 106 ranging progressively from relatively no braking effect whatsoever to being fully locked.

Means is provided for continuously urging movement of the handle 132 from the position shown thereof in FIG. 10 to the position shown thereof in full lines in FIG. 9, such means comprising the free end of the handle portion 138 being provided with a depending protuberance 148 which in conjunction with a recess 150 in the upper side of the web 129 constitute seats for the opposite ends of a coiled compression spring 152. Accordingly, an external force must be applied to the handle 132 in order to maintain the same in the position shown thereof in FIG. 10. It will thus be apparent that the handle 132 will normally be held in a position at least approaching the position shown thereof in full lines in FIG. 9 from that shown in FIG. 10. In the preferred construction, though different spring strengths could obviously be employed, the spring 152 has a strength slightly insufficient to cause pivotal movement of the handle 132 all of the way from the position shown in FIG. 10 to the full line position shown thereof in FIG. 9, this because of the substantial magnitude of the force that the shoe 142 exerts against the column 106 when the handle 132 approaches the full line position shown in FIG. 9. Indeed, such force is at its maximum when the handle 132 is in the full line position shown thereof in FIG. 9 for the reason that the pivots 136 and 146 are in the same horizontal plane, and the effective toggle linkage constituted of the handle portion 138 and the ears 144 is fully extended. While it is preferred that the strength of the spring 152 be insufficient to fully extend such toggle linkage, the strength is nevertheless such as to cause the shoe 142 to bear against the column 106 with sufficient force as to nearly lock, if not actually lock, the sleeve 110 against movement relative to the column 106.

In view of the action of the spring 152 described above, it will now be apparent that it is not essential that the pivotal connection between the ears 144 and the handle portion 138 be particularly free.

With the spring 152 having a strength only sufficient to cause nearly full extension of the effective toggle linkage, it will be apparent that the user of the apparatus can without the application of any peak force or torque cause the handle 132 to move to the position shown thereof in FIG. 10, and this is of considerable importance when it is considered that a plurality of adjustments of the position of the sleeve 110 upon the column 106 may have to be made, many of such adjustments being of minor or fine degree, in attempting to obtain an exact desired relationship of the sleeve 110 to the column 106.

When the desired exact relationship has been accomplished, it is most desirable that a great deal of security be had against the handle 132 being inadvertently caused to move toward the position shown thereof in FIG. 10, this being especially true in view of the high degree of care that may have been required to correctly arrive at positioning of the sleeve 110 on the column 106. Such additional security is readily realized inasmuch as the user of the apparatus can, after the sleeve 110 has been correctly located on the column 106, force the handle 132 through the full line position shown thereof in FIG. 9 and on to the position shown of the handle 132 in dashed outline, with the result that the toggle linkage is caused to move through its fully extended position and slightly to the oher side hereof. Means is provided to limit movement of the handle 132 at the position shown thereof in dashed outline in FIG. 9, and such means can conveniently comprise stops, not shown, on the flanges 126 and 128 in the travel path of the handle 132, or ribs 153 at the upper ends of the flanges 126 and 128 in the travel path of the shoe backing plate 140.

It should be noted that in actual practice the position of limited movement of the handle 132 is much closer to that shown in full lines at 132 than is suggested by the dashed line position shown thereof, the dashed line position of the handle 132 being somewhat exaggarated for clarity. Accordingly, no significant amount of vertical movement of the shoe 142 relative to the sleeve 110 takes place on moving the handle 132 from the position thereof urged by the spring 152 to the position shown thereof in dashed outline in FIG. 9.

With the toggle linkage having been passed through dead center, so to speak, the handle 132 is rendered much less susceptible to any inadventent actuation thereof such as to unlock or release the brake of the sleeve 110, it being obvious that a considerable degree of peak force must be exercised to move the handle 132 from one side of the dead center position of the toggle linkage to the other side thereof.

In order to facilitate the user of the apparatus in forcing movement of the handle 132 to the position shown in dashed outline thereof, the sleeve 110 incldues as an integral component thereof an integral L-shaped portion or strap 154 extending from an intermediate portion of the outer edges of the flanges 126 and 128 to the lower end of the sleeve structure 110, the arrangement being such as to define an opening 156 through which the fingers of the operator's hand can be inserted while grasping additionally the handle 132 so that with the application of a gripping force by the hand, the desired movement of the handle 132 can be effected. As will be observed, the handle 132 is of a bent configuration so as to be disposed in close proximity to the L-shaped sleeve portion 154 to facilitate such manual gripping.

It will no doubt be recognized by those skilled in the art that a spring balance means such as those employed in my previously mentioned Letters Patent and such as those set forth in connection with the previously described embodiment of this invention can be applied to the support stand 104. Alternatively, the electric power means presently to be described can be employed in connection with the support stand 104 as will be abundantly clear presently to those skilled in the field.

As will also be plain, the support arm 108 can have mounted thereon intermediate its ends an accessory tray of the same kind and in the same manner as the tray 12 mounted on the support arm as described in connection with the embodiment of the invention shown in FIG. 1 through 6. As a suggestion as to the many and varied uses to which the vertically and angularly adjustable support arm 108 can be put, a camera mount or head 158 is releasably secured to the free or outer end of the support arm 108. The camera mount or head 158 can be releasably and adjustably secured to the free outer end of the support arm 108 in any suitable manner, such as for example by means such as those disclosed in my previously mentioned Letters Patent.

Attention is now directed to yet another embodiment of the invention which differs from the previously described embodiments thereof primarily by the provision of electric power means for actuating vertical movement of the support arm structure. This embodiment of the invention involves the provision of a support stand 160 which includes a vertical tubular column 162 corresponding generally to the previously described vertical support columns 18 and 106. It is to be understood that the lower end of the column 162 can be provided with base structure corresponding to that indicated at 20 in the embodiment of the invention illustrated in FIGS. 1 through 6. The support stand 160 includes a sleeve or hub structure inclusive of braking releasable locking means as well as roller means 164 which can be of any suitable character such as that illustrated which corresponds to that incorporated in the embodiment of the invention illustrated in FIGS. 1 through 6, or which can alternatively be such as that disclosed in the embodiment of the invention shown in FIGS. 7 through 10. The parts designated generally at 164 are attached to a horizontal and radially extending support arm 166, as in the case of the previously described embodiments of the invention, and the outer free end of the support arm 166 can be applied to support an item such as a camera 168.

Electric power means designated generally at 170 in FIG. 11 is provided for actuating vertical movement of the support arm 166, and such means 170 includes a housing 172 mounted upon the upper end of the column 162 by means of a depending tubular fitting 174 that embraces the upper end of the column 162.

The housing 172 is provided with horizontally projecting motor mounting brackets upon which an electric motor 178 is mounted, the motor 178 including an output shaft 180 which extends through and is journaled in the housing 172. A reel 182 is disposed within the housing 172, and is fixed to the shaft 180 for rotation therewith by means of pins such as indicated at 184. One end of a cable 186 is wound upon the reel 182, and the other end of the cable 186 extends downwardly from the reel 182 and downwardly from the housing 172 through an opening 188 in the latter to have its lower free end anchored to the sleeve structure 164 as indicated at 190.

The electric motor 178 can if desired or deemed expedient include reduction gearing, not shown, whereby the rate of rotation of the output shaft 180 is relatively slow. The electric motor 178 can be either of the direct current or alternating current type, the latter being preferred because of the ready availability of alternating current from power mains and because no special power supply need be provided in the event batteries are not available. Whether the electric motor 178 be of the direct current type and arranged to be energized from either electric batteries or some special direct current power supply, or of the alternating current type, it is desired that the same be reversible, whereby the electric motor 178 can be energized for selectively driving rotational movement of the output shaft 180 in either a forward or a reverse direction. Inasmuch as reversible electric motors and the electrical circuitry associated therewith for selectively deenergizing the same or causing the same to operate in a forward or a reverse direction are well known and do not in and of themselves constitute inventive subject matter, illustration and description thereof is omitted as it would only tend to obscure the actual invention. Suffice to say that it is preferred that such conventional circuit means be employed that include a three-position control switch which normally occupies a position such as to deenergize the motor 178 and which can be selectively actuated against spring resistance to the other positions corresponding to the motor 178 being driven in either a forward or a reverse direction.

In view of the foregoing, the operation of the embodiment of the invention shown in FIGS. 11 through 14 will be readily understood. Whenever it is desired to change the vertical position of the support arm 166, the brake mechanism incorporated in the sleeve or hub structure 164 is released and the electric motor 178 then energized to effect the desired movement. For example, if it is desired that the arm 166 be raised, the electric motor 178 is energized so as to drive the reel 182 in rotation such as to take up cable 186 thereon, and this obviously results in the structure 164 and the arm 166 being raised. On the other hand, when it is desired that the arm 166 be lowered, the electric motor 178 is energized so as to drive the reel in a direction such as to play out additional length of the cable 186 wound thereon, with the result that the structure 164 and the arm 166 descend gravitationally with little if any application of downward manual force on such parts being required in view of the antifriction roller means incorporated in the structure 164.

Obviously, the illustrated and described embodiments of the invention are each susceptible to numerous variations and modifications without departing from the spirit of the invention. The elaborate illustration and detailed descriptions thereof are not to be construed as implying any narrowness of scope of the invention, inasmuch as the purpose thereof has been to assure conveying a full and complete understanding of the principles involved, and accordingly, attention must be directed to the appended claims in order to ascertain the actual scope of the invention.

I claim:

1. In an adjustable support stand of the type including a vertical support column having a horizontal support arm vertically adjustable thereon, the improvement comprising an elongated vertical sleeve embracing and vertically movable along the column, said support arm having one end fixed to and extending radially from the sleeve, brake means carried by the sleeve and engageable with the column for variably and frictionally opposing relative movement of said sleeve with respect to said column, and antifriction means for maintaining said sleeve and said column in coaxial relationship and also for application of any bending moment of the support arm to said column as a force couple, said antifriction means comprising a first roller means carried by said sleeve adjacent the lower end thereof and at a position angularly adjacent in the horizontal plane to the direction of the extent of said support arm from said sleeve, said first roller means bearing against said column in rolling engagement therewith, and a second roller means carried by the sleeve adjacent the upper end thereof and at a position angularly adjacent in the horizontal plane to a position diametrically opposed to the direction of the extent of said support arm from said sleeve, said second roller means bearing against said column in rolling engagement therewith, said brake means comprising a handle pivotally connected intermediate its ends to said sleeve, and a brake shoe pivotally connected to one end of the handle, said handle said brake shoe and their pivotal connections being so constructed and arranged that pivotal movement of said handle actuates movement of the brake shoe towards and away from frictional bearing engagement against said column, and spring means yielding urging pivotal movement of the handle in a direction corresponding to forcible movement of the brake shoe toward said column.

2. The combination of claim 1, wherein said sleeve is provided with a fixed hand grip adjacent the handle, whereby both the hand grip and the handle can be jointly grasped manually and gripped toward each other to force pivotal movement of the handle.

3. The combination of claim 1, wherein said pivotal connections have horizontal and parallel axes with the axis of the pivotal connection of said brake shoe being vertically movable through the horizontal plane of the axis of the pivotal connection of said handle to said sleeve during pivotal movement of said handle, means for limiting the relative extent of said vertical movement through the last mentioned horizontal plane in one direction as compared to the other direction, and such vertical movement being in opposition to the action of said spring means.

4. The combination of claim 3, wherein said brake shoe is of a resilient material, and is yieldingly compressed when said axes are in the same horizontal plane.

5. The combination of claim 3, wherein the axis of the pivotal connection of the handle to the sleeve is above and is radically spaced further from the column than the axis of the pivotal connection of the handle to the brake shoe, and said spring means being disposed to urge upward movement of the axis of the pivotal connection of the handle to the brake shoe relative to the axis of the pivotal connection of the handle to the sleeve.

References Cited

UNITED STATES PATENTS

| 1,006,834 | 10/1911 | Edwards | 248—125 |
|-----------|---------|---------|---------|
| 1,820,305 | 8/1931  | Farmer  | 248—287 |
| 1,936,529 | 11/1933 | Taylor  | 248—124 |
| 2,486,685 | 11/1949 | Schneeman | 248—124 |
| 2,567,363 | 9/1951  | Blatz   | 248—124 |
| 2,656,608 | 10/1953 | Craig et al. | 248—125 |
| 2,692,748 | 10/1954 | Anderson | 248—125 |
| 2,957,582 | 10/1960 | Lusk    | 248—125 |
| 3,269,681 | 8/1966  | Azim    | 248—123 |

FOREIGN PATENTS

| 177,519 | 2/1954  | Austria. |
| 177,545 | 11/1922 | Great Britain. |

MARION PARSONS, Jr., Primary Examiner

U.S. Cl. X.R.

248—132, 287, 408, 411